United States Patent Office 3,006,955
Patented Oct. 31, 1961

3,006,955
N'-CYCLOHEXYL OR OCTYL, N'-β-HYDROXY-ETHYL OR PROPYL, N²,N²-DIMETHYL OR DI-ETHYL-UREA
Gustav Steinbrunn, Schwegenheim-Speyer, Adolf Fischer, Mutterstadt, and Herbert Stummeyer, Mannheim, Germany, assignors to Badische Anilin- & Soda-Fabrik Aktiengesellschaft, Ludwigshafen (Rhine), Germany
No Drawing. Filed Dec. 2, 1958, Ser. No. 777,568
Claims priority, application Germany Dec. 5, 1957
5 Claims. (Cl. 260—553)

This invention relates to novel urea derivatives, more particularly to urea derivatives capable of killing weeds or preventing the growth of weeds and undesired vegetation, to phytotoxic compositions containing said derivatives and to methods of controlling undesired vegetation with the said derivatives.

Urea derivatives containing hydroxyl groups in the molecule are known to be applicable as herbicides, i.e., as agents for combating or preventing undesired vegetation. Mostly these agents are total herbicides. Furthermore, they retain their activity in the soil over a long period of time, and consequently prevent the cultivation of the soil for agricultural crops for a long time after their application.

Phytotoxic compounds usually belong to one of the two categories: selective herbicides or total herbicides. Selective herbicides are those which destroy only certain types of plants, while leaving others unaffected. A common example of selective herbicidal compositions are those employed to destroy broadleaf weeds in lawns, while leaving the narrowleaf grasses unaffected. Total herbicides are those which destroy virtually all plant life. They are employed for clearing areas of soil of weeds, in order to prepare the land for the cultivation with crop plants. It is a criterion for the usefulness of total herbicides that they become inactive in a relatively short period of time, and allow agricultural crops to be sown soon after their application.

Included among total herbicides such as are known in the art are chlorates. Chlorates, however, have the shortcomings that they are toxic to human and animal life, corrosive to metal tanks and lines and, moreover, make the treated weeds readily inflammable. Another known total herbicide is p-chlorophenyldimethylurea. This compound, it is true, overcomes the disadvantages inherent in chlorates, but it retains its activity in the soil for a long time after its application and during this time prevents the cultivation of agricultural crops.

An object of this invention is to provide herbicides having a very selective action.

A further object of this invention is to provide herbicides having a relatively short period of herbicidal activity after application.

A further object of this invention is to provide herbicides which can be more readily emulsified in water than the herbicides known from the prior art.

These objects are achieved by using urea derivatives of the general formula

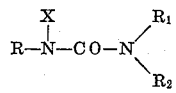

wherein R is a radical selected from the group consisting of cyclohexyl and cyclooctyl, X is a radical selected from the group consisting of beta-hydroxyethyl and beta-hydroxypropyl and $R_1$ and $R_2$ are radicals selected from the group consisting of methyl and ethyl.

The urea derivatives may be obtained, for example, by reacting cycloalkyl amines with carbamic acid chlorides or carbamic acid esters.

Preferred examples of carbamic acid chlorides or esters for use in the preparation of the urea derivatives are dimethyl- and diethyl-carbamic acid chlorides or the corresponding esters of low molecular alcohols, such as methanol, ethanol, or of phenol.

The reaction of N-beta-hydroxyethyl-cyclohexylamine with dimethylcarbamic acid chloride proceeds as follows:

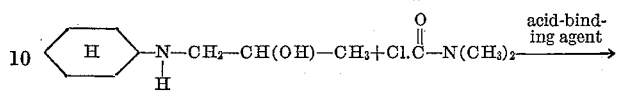

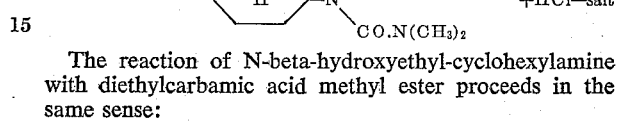

The reaction of N-beta-hydroxyethyl-cyclohexylamine with diethylcarbamic acid methyl ester proceeds in the same sense:

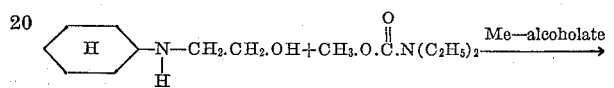

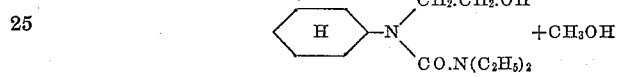

In these equations acid binding agents mean inorganic or organic compounds, such as salts of weak acids and strong bases, for example, sodium carbonate or potassium carbonate, tertiary amines, e.g., dialkylanilines or trialkylamines with from 1 to 4 carbon atoms in the alkyl groups, for example, dimethylaniline, triethylamine, or pyridine; Me represents metals which can form alcoholates, such as alkali metal, alkaline earth metal, for example sodium, potassium calcium, or aluminium ethylate or isopropylate.

The use of organic diluents, as for example aliphatic hydrocarbons, benzene, toluene, dioxane, tetrahydrofurane or dimethylformamide may be preferable in carrying out the reaction.

Examples of cycloalkylamine are N-beta-hydroxyethyl-cycloalkylamines and N-beta-hydroxypropyl-cycloalkylamines.

The N-hydroxy-cycloalkylamines may be obtained either by reaction of alkylene oxides, such as ethylene oxide and propylene oxide, ethylene chlorhydrin, glycerine chlorhydrins or epichlorhydrin with cycloaliphatic amines or by the action of caustic soda solution on halogenalkyl esters of substituted cycloalkyl carbamic acids by way of the oxazolidones as intermediate products.

Urea derivatives of the said kind which are especially pure and highly active as herbicides are formed when temperatures between about 40° and 80° C. are maintained during the preparation. Higher temperatures are unsuitable because the carbamic acid chloride would then react too extensively with the hydroxyl groups of the substituents on the amine nitrogen. It should also be noted that the hydroxyl group in 2-position, upwards of 80° C., reacts with the dimethylamine radical, splitting off of dimethylamine and forming N-cyclohexyl-2-methylisooxazolidone for example in the case of N-beta-hydroxypropyl-N-cyclohexyl-N'-dimethylurea. The undesirable course of the reaction may be further promoted by ions of heavy metals, such as iron ions. The presence of such ions should therefore be avoided.

For the production of the new urea derivatives the following examples may be given, the parts being understood to be parts by weight:

(a) 22.5 parts of dimethylcarbamic acid chloride are allowed to flow into 29 parts of N-hydroxyethyl-cyclohexylamine and 25 parts of dimethylaniline at 50° to 55° C. and the reaction mixture is kept at the same temperature for another 18 hours. For working up, 60 parts of water and such an amount of dilute hydrochloric acid are added that the reaction mixture has a congo acid reaction. The organic phase which separates is washed with water until neutral. After drying under reduced pressure 18 parts of N-2-hydroxyethyl-N-cyclohexyl-N'-dimethyl-urea are obtained as a syrupy mass. On analysis this compound gives N=13.15 percent compared with a theoretical amount of 13.08 percent.

(b) 44 parts of diethylcarbamic acid chloride are allowed to flow while stirring at 60° to 65° C. into a solution of 57 parts of N-hydroxyethyl-cyclohexylamine and 52 parts of dimethylaniline in 180 parts of toluene, the whole then being kept at this temperature for another 10 hours. It is worked up as described in (a). 63 parts of N-2-hydroxyethyl-N-cyclohexyl-N'-diethylurea remain as a syrupy residue. On analysis this compound gives N=11.33 percent compared with a theoretical amount of 11.56 percent.

(c) 48 parts of dimethylcarbamic acid chloride are added within 90 minutes at 50° to 60° C. to 53 parts of N-beta-hydroxypropyl-cyclohexylamine and 40 parts of triethylamine in 100 parts of benzene. The reaction is completed by further keeping the reaction mixture at 60° to 70° C. for another 7 hours. By working up as described under (a) 43 parts of a syrup of N-2-hydroxypropyl-N-cyclohexyl-N'-dimethylurea are obtained. On analysis this compound gives N=12.26 percent compared with a theoretical amount of 12.27 percent.

(d) 26 parts of dimethylcarbamic acid chloride are allowed to flow while stirring, at 40° to 45° C., into 44 parts of N-beta-hydroxypropyl-cyclo-octylamine, 25 parts of triethylamine and 100 parts of anhydrous benzene. The reaction is completed by keeping the reaction mixture at the same temperature for 20 hours. The cooled mixture has added to it 100 parts of water and hydrochloric acid until a congo acid reaction is obtained. The benzene layer which separates is washed neutral with water and the benzene removed at reduced pressure. 53 parts of N-2-hydroxypropyl-N-cyclo-octyl-N'-dimethylurea are obtained as a syrupy mass. On analysis this compound gives N=10.88 percent compared with a theoretical amount of 10.92 percent.

(e) 15 parts of dimethylcarbamic acid chloride are allowed to flow into 23 parts of N-hydroxyethyl-cyclo-octylamine and 17 parts of dimethylaniline at 50° to 53° C. while stirring. The temperature is then kept at the same height for 10 hours while stirring. The reaction mixture is worked up as described under (a). 15 parts of N-2-hydroxyethyl-N-cyclo-octyl-N'-dimethylurea are obtained as a liquid mass. On analysis this compound gives N=11.67 percent compared with a theoretical amount of 11.56 percent.

The urea derivatives obtained in the manner described or a similar manner can be applied in dispersed or dissolved form. They can be used in admixture with other herbicides. For the admixture there are suitable for example chlorphenoxy-alkyl carboxylic acids, chlorinated monocarboxylic acids, for example alpha.alpha-dichlor-propionic acid, or inorganic salts, such as chlorates or borax.

The urea derivatives according to this invention are soluble in almost all organic solvents and have an excellent action as selective herbicides with short duration of action. By reason of their hydrophilic hydroxy alkyl groups they can readily be emulsified; this is of advantage in practical use. A further valuable property is their solubility in oils of various kinds, including waste oils, and in hydrocarbons, for example in lubricating oils, machine oils, gas oils and fuel oils, petroleum or heavy gasoline. Since most of the urea compounds are liquid or syrupy, they adhere well to the plants and therefore penetrate easily into the plant tissue so that they act even after a short time. The agents are above all highly efficient pre-emergence herbicidal agents for controlling weed growth prior to the appearance of seedlings of vegetables, for example in the cultivation of asparagus, strawberries and hoed vegetables (potatoes, turnips, cabbage and the like).

Many types of carriers or diluents are employed in the art to provide a freely-flowing or sprayable herbicide either as finely divided or particulated solids or as a liquid. The urea derivatives of the invention can thus be admixed with such finely divided, substantially inert solid diluents as silica gel, gypsum, talc, natural clays, diatomaceous earth, pyrophyllite, flours, and similar dust-forming solids conventionally used for this purpose. The active compounds can also be mixed in stable or fixed form with fertilizers or other soil conditioners. The effectiveness of the active ingredient can often be improved or considerably enhanced by the use of any of the well-known sticking agents or binders.

The urea derivatives are preferably admixed in a phytotoxic amount, i.e. phytotoxic quantity, with water in the form of a suspension or emulsion, although they may also be mixed with other non-solvents. The active urea derivatives are soluble in many organic solvents and can also be dispersed in an aqueous media after dissolution in the organic solvent. Emulsifying, wetting or surface-active dispersing agents are preferably employed to obtain a uniform mixture or suspension of the active ingredient with the carrier. Thus, such surface-active dispersing agents can be incorporated in a dust mixture for use as a concentrate for the purpose of handling, shipping, etc., and later dispersed in water prior to application at a particular location.

Solid surface-active dispersing agents include, for example, bentonite, fuller's earth, attapulgite and other clays. Where water is employed as a sprayable carrier, the wetting agent functions to allow the water to admix freely with and wet the surface of the physical mixture which in turn permits the particle to be readily granulated. Both ionic and non-ionic emulsifiers can be employed such as alkoxy condensation products of phenols and organic acids, complex ether alcohols, mahogany soaps, etc. Detergent-type wetting agents are likewise contemplated such as those disclosed, for example, in the article entitled "Synthetic Detergents—Up to Date—II," by John W. McCutcheon, Soap and Sanitary Chemicals, July, August, September and October 1952.

The urea compounds and their solutions or mixtures are sprayed or spread onto the leaves or the soil. They can be used both as pre-emergence and as post-emergence weed killers.

The excellent action of the new agents is shown in the following examples.

*Example 1*

An emulsion prepared with 1.35 to 2.7 kilograms of N-2-hydroxyethyl-N-cyclohexyl-N'-dimethylurea in 1,000 liters of water destroys the following plants in the greenhouse when applied in an amount of between 4 and 8 kilograms of active substance per hectare: *Sinapis alba, Panicum sanguinale, Galium aparine, Lolium perenne, Atriplex hastatum* and *Chenopodium album.*

*Example 2*

Light sandy soil is sprayed with an emulsion of N-2-hydroxyethyl-N-cyclohexyl-N'-diethylurea in an amount of 3 to 6 kilograms of active substance in 1,000 liters of water per hectare. Seeds of *Avena fatua, Sinapis alba, Galinsoga parviflora* and *Senecio vulgaris* sown in the soil thus prepared at first develop to the cotyledon stage. After about a fortnight almost all of the young seedlings have withered.

*Example 3*

A patch of arable soil which has been very regularly seeded with weed plants is sprayed with an emulsion of N-2-hydroxypropyl-N-cyclohexyl-N'-dimethylurea in an amount of 15 to 25 kilograms of active substance in 1,000 liters of water per hectare. After three weeks the following weed plants are totally destroyed: *Sinapis alba, Stellaria media, Galinsoga parviflora, Solanum nigrum, Matricaria inodora, Fumaria officinalis, Urtica urens, Chenopodium album, Sonchus arvensis* and *Polygonum aviculare.* After about 8 months the treated field was sown with oats (*Avena sativa*). The oats sprout well and develop normally.

*Example 4*

N-2-hydroxypropyl - N - cyclooctyl-N'-dimethylurea is applied to dry silica gel of a grain size of 1 to 2 millimeters at a ratio of 1:99 and this combination is spread uniformly in an amount of 200 kilograms per hectare over beet sugar plants about 10 centimeters high, which shortly before have been thinned out by hoeing. After 4 weeks, the growth of the plants has not been repressed nor have their leaves been injured in comparison with untreated plants. The following weed plants are successfully combated by the treatment with the strewed granulate: *Stellaria media, Urtica urens, Chenopodium album, Matricaria inodora, Sinapis alba* and *Galinsoga parviflora.*

*Example 5*

A plot of strawberry plants, after a hoeing of the soil has previously been carried out, is treated with a mixture of N-2-hydroxyethyl-N-cyclooctyl-N'-dimethylurea and calcium nitrate, in which the N-hydroxyethyl-N-cyclooctyl-N'-dimethylurea content amounts to 1.5% of that of the calcium nitrate, in finely granular form (grain size about 1 millimeter) at the rate of 200 kilograms per hectare. This granulate destroys or checks various kinds of weeds in sprouting, namely *Sinapis alba, Chenopodium album, Lolium perenne, Panicum hirsutum* and *Stellaria media.* The growth of the strawberry plants is not adversely affected.

*Example 6*

A test field planted with sugar beet is thinned out and then treated in thirds with N-2-hydroxypropyl-N-cyclooctyl-N'-dimethylurea, N-cyclooctyl-N'-dimethylurea and N - hydroxypropyl - N - p - chlorphenyl - N' - dimethylurea, respectively, in an amount of 1.8 kilogram each in 1,000 liters of water per hectare. After four weeks it is found that only the sugar beets which have been under the action of N-2-hydroxypropyl-N-cyclooctyl-N'-dimethylurea have undamaged leaves, whereas those treated with N - cyclooctyl - N' - dimethylurea and N - hydroxypropyl - N - p - chlorphenyl - N' - dimethylurea are corroded in places and have chlorotic patches on their leaves. Within the same period the three substances, on their respective plots, destroy the following weeds or markedly repress the germination thereof: *Galinsoga parviflora, Urtica urens, Sinapis arvensis, Capsella bursa pastoris, Stellaria media* and *Poa annua.*

The invention is hereby claimed as follows:

1. Urea derivatives of the formula

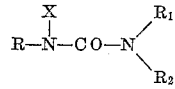

wherein R is a member selected from the group consisting of cyclohexyl and cyclooctyl, X is a member selected from the group consisting of beta-hydroxyethyl and beta-hydroxypropyl and $R_1$ and $R_2$ are each a member selected from the group consisting of methyl and ethyl.

2. As a new compound N-cyclohexyl-N-beta-hydroxyethyl-N'-dimethylurea.

3. As a new compond N-cyclohexyl-N-beta-hydroxypropyl-N'-dimethylurea.

4. As a new compound N-cyclooctyl-N-beta-hydroxyethyl-N'-dimethylurea.

5. As a new compound N-cyclooctyl-N-beta-hydroxypropyl-N'-dimethylurea.

References Cited in the file of this patent

UNITED STATES PATENTS

| | | |
|---|---|---|
| 2,661,272 | Searle | Dec. 1, 1953 |
| 2,779,669 | Snyder | Jan. 29, 1957 |
| 2,788,268 | Tursich | Apr. 9, 1957 |
| 2,870,205 | Beaver et al. | Jan. 20, 1959 |
| 2,876,260 | Huyser et al. | Mar. 3, 1959 |

FOREIGN PATENTS

| | | |
|---|---|---|
| 1,055,287 | Germany | Apr. 16, 1959 |
| 1,064,051 | Germany | Aug. 27, 1959 |